United States Patent [19]
Sato et al.

[11] 3,711,203
[45] Jan. 16, 1973

[54] VEHICULAR TRACK MEASURING APPARATUS

[75] Inventors: Kazuo Sato; Takashi Aoki, both of Toyota, Japan

[73] Assignee: Toyota Jidosha Kogyo Kabushiki Kaisha, Toyota-shi, Japan

[22] Filed: Nov. 23, 1970

[21] Appl. No.: 91,764

[30] Foreign Application Priority Data

Nov. 25, 1969 Japan..................................44/93936

[52] U.S. Cl...................356/152, 340/24, 343/112 D
[51] Int. Cl...............................................G01b 11/26
[58] Field of Search....356/141, 152; 340/24, 27 NA; 343/112 S, 112 D, 106 R; 350/6, 7

[56] References Cited

UNITED STATES PATENTS

3,400,398  9/1968  Lapeyre et al.....................343/106 R
1,562,485  11/1925  Affel..................................343/112 S

*Primary Examiner*—Benjamin A. Borchelt
*Assistant Examiner*—S. C. Buczinski
*Attorney*—Stevens, Davis, Miller & Mosher

[57] ABSTRACT

Apparatus for measuring a track of a vehicle running on a test course, having: means for generating a voltage proportional to a distance along the longitudinal axis of the course between a track measurement starting plane on the course and the vehicle by generating standing radio waves above the course and counting the number thereof; and means for generating a voltage proportional to an angle contained by a reference vertical plane with respect to the course and another vertical plane with respect to the course intersecting the reference vertical plane and the vehicle by scanning the course rotatively with a laser beam from the line of intersection of these two vertical planes and measuring the time required for scanning the angle.

17 Claims, 20 Drawing Figures

VEHICULAR TRACK MEASURING APPARATUS

BACKGROUND OF THE INVENTION

1. Field of the Invention

This invention relates to a vehicular track measuring apparatus, and particularly relates to a vehicular track measuring apparatus which includes means for generating a voltage indicative of a longitudinal position of a vehicle with respect to a test course on which the vehicle runs by providing standing radio waves above the course and counting the number thereof, and means for generating a voltage indicative of a lateral position of the vehicle with respect to the course by providing a scanning laser beam above the course and measuring a scanning time thereof.

2. Description of the Prior Art

Tracks of the motor vehicles must be measured in various tests of the motor vehicles, such as maneuverability tests, side wind stability tests, brake tests, and so on.

The conventional method for measuring a track of a vehicle running on a test course is a method wherein a track printing apparatus mounted on the vehicle prints the track of the vehicle directly on the course surface with ink, and then test engineers or technicians measure the printed track and record the track on a paper on a reduced scale. The disadvantage of this method is that the real-time processing of data obtained by this method is impossible, and further that the measurement of the printed track takes a long time thereby preventing speedy operation of the tests.

The following two apparatus are usable for the real-time measurement of the track of a vehicle: one is an inertial navigational apparatus including a gyroscope and a computer, which measures the acceleration of the vehicle and then computes the velocity and the track of the vehicle by integration of the acceleration and the velocity respectively; and the other is an optical-electronic apparatus including apparatus for measuring azimuth angle optically and a computer, which measures angular bearings of the vehicle from two or more base points on the ground and computes the track of the vehicle using the result of the angular bearing measurement. Although these two apparatus have an advantage that the measurement of the track can be made in real time as mentioned as above, these two apparatus have a serious disadvantage as vehicular track measuring apparatus, which nullify the above-mentioned advantage. This disadvantage is that the obtained result by these two apparatus lacks the accuracy required for the motor vehicle tests.

Therefore, apparatus which can measure the track of a vehicle running on a test course in real time with the required accuracy has been sought.

SUMMARY OF THE INVENTION

This invention is directed to apparatus for measuring a track of a vehicle running on a test course.

The track of a vehicle is measured by generating a voltage indicative of a longitudinal position of the vehicle which is a position of the vehicle along the longitudinal axis of the course, and the other voltage indicative of a lateral position of the vehicle which is a position of the vehicle along the lateral axis of the course.

The voltage indicative of a longitudinal position of the vehicle is produced by generating above the course standing radio waves, counting the number of the standing radio waves crossed by the vehicle, and generating a voltage proportional to the counting result.

The standing radio waves are generated by a high-frequency oscillator, and a pair of transmitting antennas connected to the high-frequency oscillator and disposed substantially above the longitudinal center line of the course at both ends of the course facing each other. Apparatus mounted on the vehicle and comprising a pulse generator, a first counter, and a first digital-analog converter counts the number of the standing radio waves and generates the voltage proportional to the result of the counting.

The voltage indicative of a lateral position of the vehicle is produced by scanning the course with a laser beam at a constant angular speed measured in a horizontal plane with respect to the course, measuring a time between the instant when the laser beam hits a first laser beam detector disposed on the ground and the instant when the laser beam hits a second laser beam detector mounted on the vehicle, and generating a voltage proportional to the measured time. The vertical plane with respect to the course containing the first laser beam detector and a rotation center of the laser beam is a reference vertical plane. Since the laser beam has a constant angular speed measured in a horizontal plane with respect to the course, the voltage proportional to the measured time is proportional to an angle contained by the reference vertical plane and a vertical plane with respect to the course containing the rotation center of the laser beam and the second laser beam detector.

Mathematically, the position of the vehicle on the test course is completely determined by the longitudinal position of the vehicle and the above-mentioned angle.

The scanning of the laser beam is done by a laser beam scanner. A first signal generator is connected to the first laser beam detector to generate a signal when the laser beam hits the first laser beam detector. A radio transmitter is connected to the first signal generator to transmit the signal to the vehicle. Apparatus mounted on the vehicle and comprising a signal receiver, the second laser beam detector, a second signal generator, a clock pulse generator, a second counter, a shift register, and a second digital-analog converter generates the voltage proportional to the angle contained by the reference vertical plane and the vertical plane containing the laser beam rotation center and the second laser beam detector.

For further practical use, a voltage proportional to a distance along the lateral axis of the course from the vehicle to the reference vertical plane is produced by multiplying a voltage proportional to a distance from the laser beam rotation center to a plane perpendicular to the longitudinal axis of the course and passing through the vehicle by the voltage proportional to the angle contained by the reference vertical plane and the vertical plane containing the laser beam rotation center and the second laser beam detector.

This multiplication is made by a multiplier connected to the second digital-analog converter and to an analog adding circuit. The analog adding circuit is connected to the first digital-analog converter and a potentiometer and produces the voltage proportional to the distance from the laser beam rotation center to the plane perpendicular to the longitudinal axis of the course and passing through the vehicle.

When the above-mentioned multiplication is made, the distance from the laser beam rotation center to the vehicle must be sufficiently large so as to prevent the error of substitution of an angle for the tangent of the same angle from exceeding a given limit.

The voltage indicative of a longitudinal position of the vehicle and the voltage proportional to the distance along the lateral axis of the course from the vehicle to the reference vertical plane may be fed to a X-Y plotter for the real-time drawing of track of the vehicle on a paper, or may be put with such other test data as the elapsed time, steering angle of the vehicle, velocity and direction of the wind blowing above the course into a computer for further real-time processing or into recorders such as magnetic tape recorders for recording.

The voltage proportional to the angle contained by the reference vertical plane and the vertical plane containing the laser beam rotation center and the second laser beam detector may also be used for real-time processing or recording.

If an angle contained by the longitudinal axis of the course and the reference vertical plane is zero or small, the track of the vehicle drawn on a paper by feeding the voltage indicative of a longitudinal position of the vehicle and the voltage proportional to the distance along the lateral axis of the course from the vehicle to the reference vertical plane to the X-Y plotter deviates little from the actual track of the vehicle (when the angle contained by the longitudinal axis of the course and the reference vertical plane is zero, the deviation is due only to the error of the substitution of the angle contained by the reference vertical plane and the plane containing the laser beam rotation center and the second laser beam detector for the tangent of the same angle). However, when the angle contained by the longitudinal axis of the course and the reference vertical plane is big, the voltage proportional to the distance along the lateral axis of the course from the vehicle to the reference vertical plane must be processed in the computer so as to be changed to a voltage proportional to the distance along the lateral axis of the course from the vehicle to a vertical plane with respect to the course parallel to the longitudinal axis of the course and containing the laser beam rotation center before the voltages are fed to the X-Y plotter for drawing the track of the vehicle on a paper.

The result thus obtained by the apparatus of this invention is sufficiently accurate for the motor vehicle tests.

From the foregoing, the apparatus of this invention has the advantage of real-time measuring of the track of the vehicle as well as the advantage of accurate measurement of the track of the vehicle.

DESCRIPTION OF THE PREFERRED EMBODIMENT

The longitudinal axis of the test course on which the measurement of a vehicular track is made is hereinafter called the X axis. The lateral axis of the same test course is hereinafter called the Y axis. However, the use of the "longitudinal axis" and the "lateral axis" is made wherever more appropriate.

Figure 1:
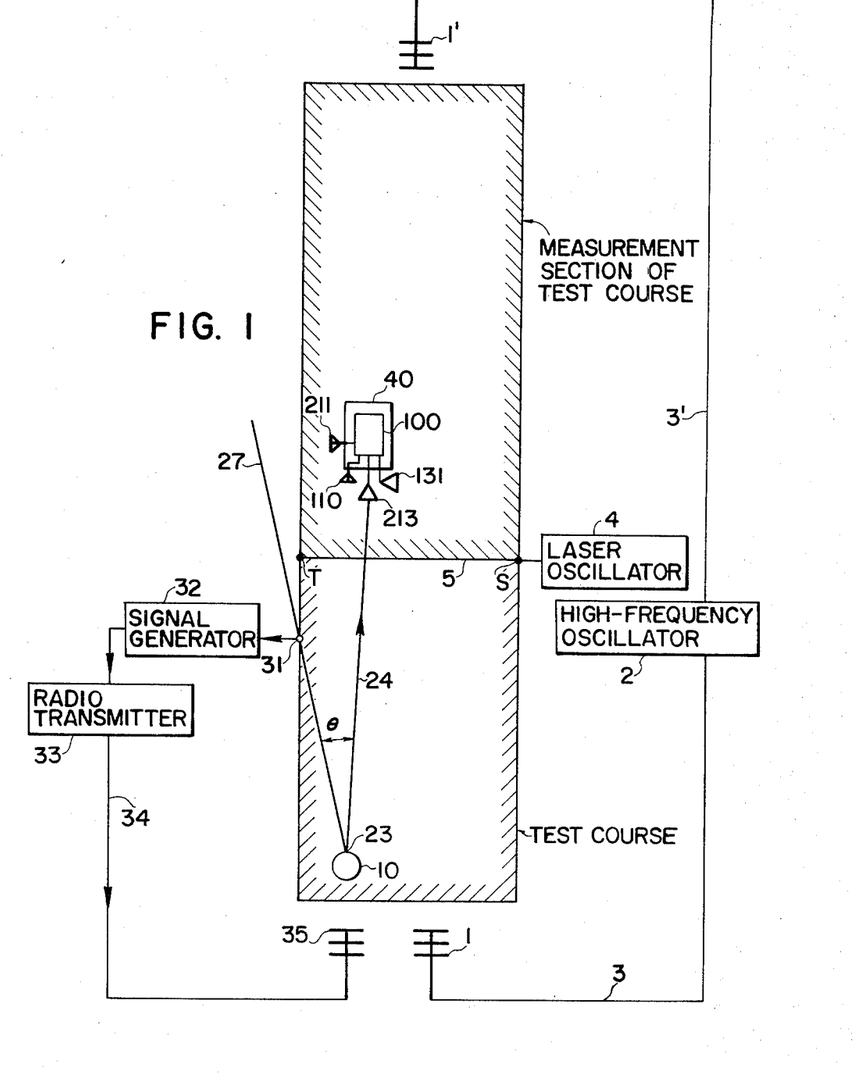
FIG. 1 is a plan view of a vehicular track measuring apparatus disposed with respect to a test course on which the measurement of a vehicular track is made according to the invention.

Referring to FIG. 1, a pair of transmitting antennas 1 and 1' are disposed substantially above the longitudinal center line of and at the both ends of the test course facing each other and connected to a VHF or UHF high-frequency oscillator 2 by feeders 3 and 3' respectively to generate above the test course between the antennas standing VHF or UHF radio waves with a fixed wave length as determined by the frequency of the high-frequency oscillator 2. Synchronization of the waves radiated from the antennas 1 and 1' is necessary to generate standing radio waves. To synchronize the waves, the output of the same oscillator 2 must be fed to the antennas 1 and 1' by feeders 3 and 3'.

If long feeders are to be used, a subharmonic of the high-frequency oscillator 2 is usually fed to the vicinity of the antennas and then multiplied there to become the synchronized high-frequency waves having the required frequency.

The frequency or wave length of the standing waves is selected after due consideration of the required accuracy necessary for the measurement of the vehicular track.

A receiving antenna 110 which is a component of a signal processing device 100 mounted on a vehicle 40 whose track is being measured catches the standing waves.

A laser oscillator 4 projects a laser beam 5 parallel to the Y axis. A vertical plane with respect to the course containing the laser beam 5 is a track measurement starting plane from which the track measurement by the signal processing device 100 is started. Points of intersection of the track measurement starting plane and two boundary side lines of the test course are points T and S respectively. A laser beam detector 131 which is a component of the signal processing device 100 detects the laser beam 5.

A laser beam scanner 10 scans the test course with a laser beam 24. The laser beam 24 moves at a constant angular velocity in a horizontal plane with respect to the course. A laser beam detector 31 is disposed on the ground and connected to a signal generator 32. When the laser beam 24 hits the laser beam detector 31, the signal generator 32 produces an electric signal $S_1$. The signal generator 32 is connected to a radio transmitter 33 which sends the signal $S_1$ to a transmitting antenna 35 by way of a feeder 34. The signal $S_1$ is transmitted from the antenna 35. The laser beam detector 31 comprises a photoelectric cell (not shown in the drawing), and the signal generator 32 comprises a pulse amplifier and a saturation amplifier (both not shown in the drawing). A receiving antenna 211 which is a component of the signal processing device 100 catches the signal $S_1$.

A vertical plane 27 with respect to the course containing a rotation center 23 of the laser beam 24 and the laser beam detector 31 is a reference vertical plane.

A laser beam detector 213 which is a component of the signal processing device 100 detects the laser beam 24. The time $\tau$ between the instant when the antenna 211 receives the signal $S_1$ and the instant when the laser beam 24 hits the laser beam detector 213 is measured by the signal processing device 100. Since the laser beam 24 moves at a constant angular velocity in a horizontal plane with respect to the course, the time $\tau$ is proportional to an angle $\theta$ contained by the reference vertical plane 27 and a vertical plane with respect to the course containing the laser beam 24. In this case, of course, the time between the instant when the laser beam 24 hits the laser beam detector 31 and the instant when the antenna 211 receives the signal $S_1$ is neglected.

In this embodiment, the electric signal $S_1$ is used in order to send a signal indicating the detection of the laser beam 24 by the laser beam detector 31 to the signal processing device 100. The signal indicating the detection of the laser beam 24 by the laser beam detector 31 can be transmitted to the signal processing device 100 by another kind of method such as a light modulation method.

Figure 3:
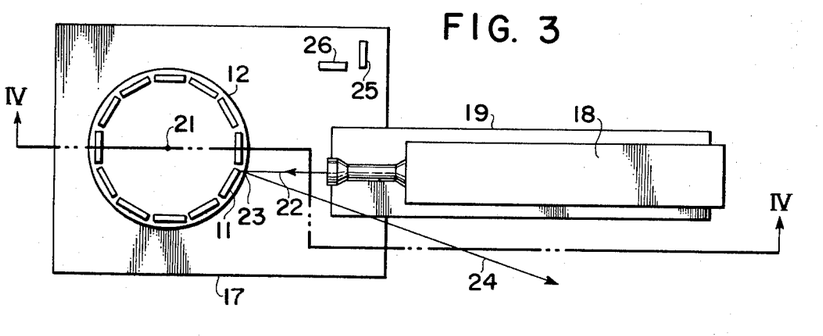
FIG. 3 is a plan view of a laser beam scanner according to the invention.
Figure 4:
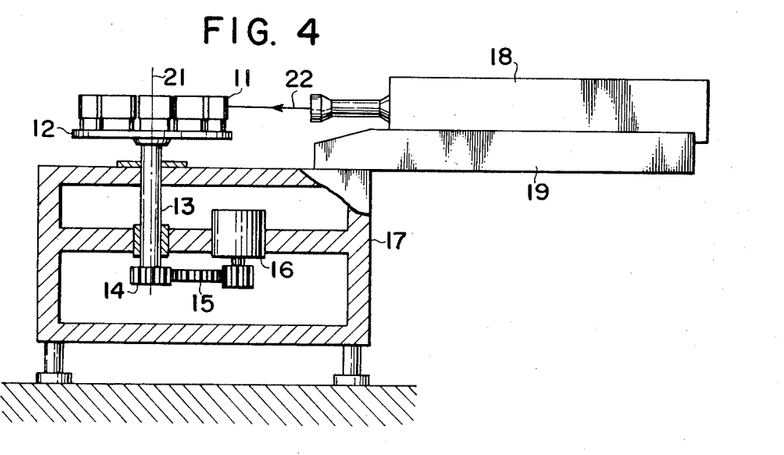
FIG. 4 is a view of a cross section AA of FIG. 3.

The laser beam scanner 10 has a structure as shown in FIGS. 3 and 4. A laser beam oscillator 18 supported by a frame 19 which is attached to a frame 17 generates a laser beam 22. The laser beam 22 has a wave length of 6,328 A (red light) and is focussed (the diameter of the beam is 20 millimeters at a point 500 meters distant from the oscillator 18). The output of the oscillator 18 is more than 1 milliwatt. Sixteen plane mirrors 11 each of which is 50 millimeters wide and 40 millimeters high are mounted on a disc 12 at regular intervals with their reflective surfaces being parallel to an axis of rotation 21 of the disc and contacting an inscribed circle concentric with the rotation axis 21. The rotation axis 21 is vertical with respect to the course. The disc 12 is attached to a shaft 13 rotatively supported by the frame 17 and having a toothed pulley 14. The pulley 14 is driven by way of a toothed belt 15 by a synchronous motor 16 supported by the frame 17. The rotation speed of the disc is 900 r.p.m. The laser beam 22 is reflected at a point 23 on the surface of the mirror 11 to become the scanning laser beam 24. This point 23 is the laser beam rotation center 23 shown in FIG. 1. The point 23 in FIG. 3 moves a little as the disc 12 rotates, but the point 23 can be considered fixed from practical viewpoint. The laser beam oscillator 18 is disposed so that the distance between the axis 21 and the extension of the centerline of the laser beam 22 is 40 millimeters. The frame 17 is disposed on the ground and is adjustable so that the upper surface of the frame 17 becomes horizontal with respect to the course. Levels 25 and 26 are attached on the upper surface of the frame 17. The laser beam scanner 10 is so precisely constructed as a whole that the total amplitude of vertical deflection of the laser beam 24 may not exceed 40 millimeters at a point 1,000 meters distant from the laser beam rotation center 23.

In this embodiment, the laser beam 24 moves only within a horizontal plane with respect to the course, provided that no deflection of the laser beam exists. However, it is possible to swing the laser beam 24 intentionally in vertical directions with high-frequency at the same time, while the laser beam 24 moves at a constant angular velocity measured in a horizontal plane with respect to the course, whereby the failure of detection of the laser beam 24 by the laser beam detectors 31 and 213 is prevented.

Referring to FIG. 2a through 2j and FIG. 5, the structure and operation of the signal processing device 100 is described below.

Figure 5:
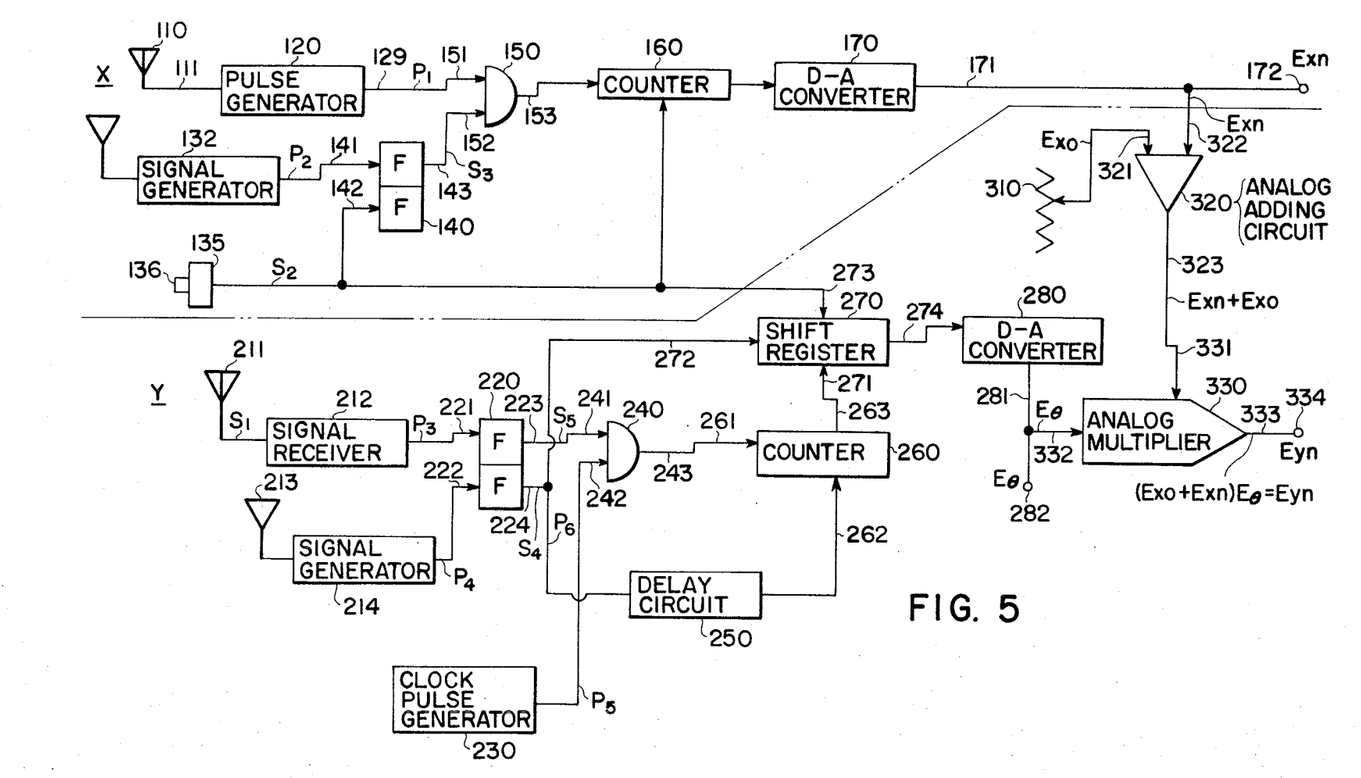
FIG. 5 is a block diagram of a signal processing device of this invention mounted on a vehicle whose track is measured.

In FIG. 5, a part separated from the other part by broken lines and designated as $\underline{X}$ is a part which produces a voltage indicative of the longitudinal position of the vehicle. The other part designated as $\underline{Y}$ is a part which produces voltage indicative of the lateral position of the vehicle.

First, the part $\underline{X}$ is described below.

Figure 2A:
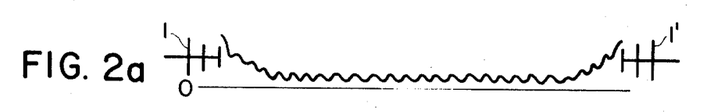
FIG. 2a through 2j are drawings showing wave forms which appear in the vehicular track measuring apparatus of this invention.
Figure 2B:
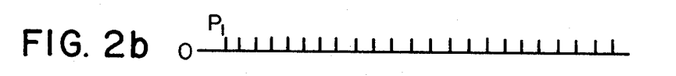

A pulse generator 120 is connected to the receiving antenna 110 by way of a connector 111. The pulse generator 120 generates an electric pulse $P_1$, as shown in FIG. 2b, every time the receiving antenna 110 catches a cyclic change of absolute value of the electric field intensity of the standing radio waves as the vehicle moves. In other words, one pulse $P_1$ is produced for every half-wave of the standing radio waves as the vehicle moves. The standing radio waves are shown in FIG. 2a.

Figure 6:
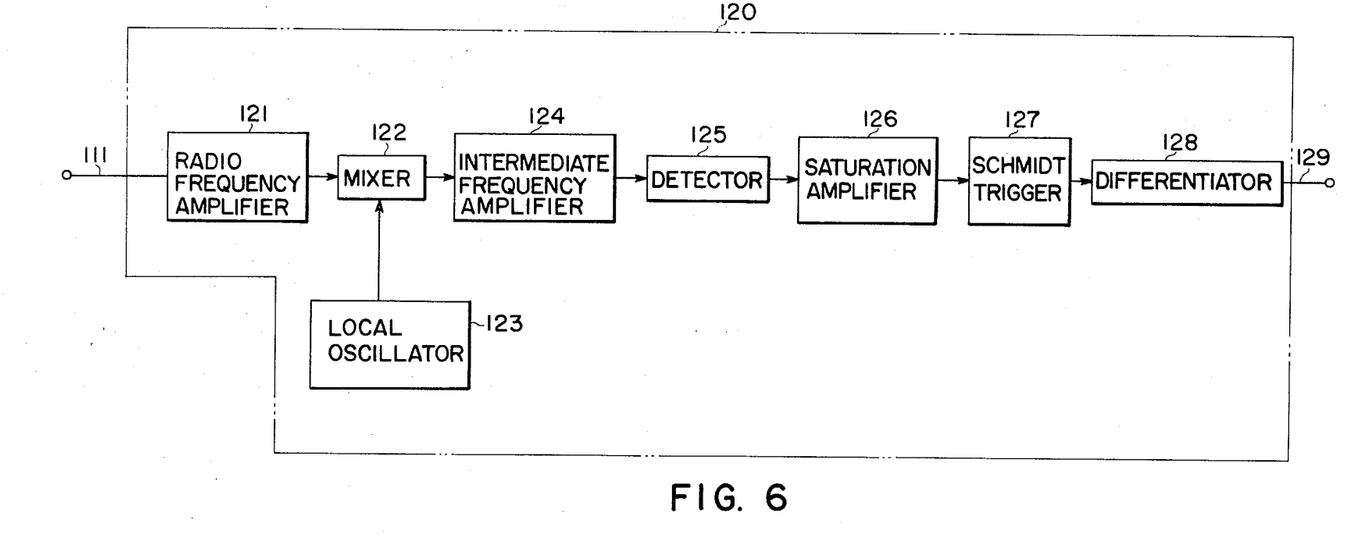
FIG. 6 is a block diagram of a pulse generator which is shown in FIG. 5.

The pulse generator 120 comprises, as shown in FIG. 6, a radio frequency amplifier 121 connected with the connector 111, a mixer 122 connected to the radio frequency amplifier 121, a local oscillator 123 connected to the mixer 122, an intermediate frequency amplifier 124 connected to the mixer 122, a detector 125 connected to the intermediate frequency amplifier 124, a saturation amplifier 126 connected to the detector 125, a Schmidt trigger 127 connected to the saturation amplifier 126, a differentiator 128 connected to the Schmidt trigger 127, and a connector 129 connected to the differentiator 128.

Figure 2C:
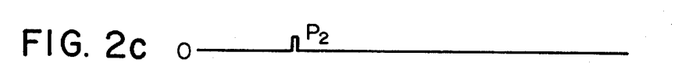

A signal generator 132 is connected to the laser beam detector 131 and generates an electric pulse $P_2$, as shown in FIG. 2c, when the laser beam 5 hits the laser beam detector 131. The laser beam detector 131 comprises a photoelectric cell, and the signal generator 132 comprises a pulse amplifier and a saturation amplifier. (The above-mentioned photoelectric cell, pulse amplifier, and saturation amplifier are not shown in the drawing.) The signal generator 132 is connected to an input connector 141 of a flip-flop circuit 140. An output connector 143 of the flip-flop circuit 140 is connected to an input connector 152 of an AND gate 150. The output connector 129 of the pulse generator 120 is connected with a second input connector 151 of the AND gate 150. A clearing signal generator 135 is connected to a second input connector 142 of the flip-flop circuit 140. The clearing signal generator 135 generates an electric signal $S_2$ when a man pushes a button 136 included in the clearing signal generator 135. The flip-flop circuit 140 generates a continuous electric signal $S_3$ after the circuit 140 receives the pulse $P_2$ until the circuit 140 receives the signal $S_2$. The AND gate 150 passes the pulse $P_1$ by way of an output connector 153 thereof as long as the signal $S_3$ is fed to the input connector 152 thereof.

A counter 160 is connected to the output connector 153 of the AND gate 150. The counter 160 counts the number of the pulse $P_1$ and records the number in the form of electric signals until the next one pulse $P_1$ is counted. The counter 160 is preferably a decimal counter.

Figure 2D:
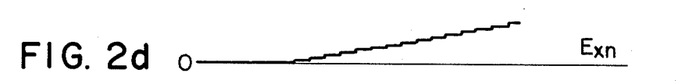

A digital-analog converter 170 (hereinafter designated as the D-A converter 170) is connected to the counter 160. The D-A converter 170 generates a voltage $E_{xn}$ proportional to the number recorded in the counter 160. The voltage $E_{xn}$, which is shown in FIG. 2d, is a voltage proportional to the distance from the receiving antenna 110 mounted on the vehicle 40, as shown in FIG. 1, to the track measurement starting plane and is supplied to a terminal 172 by way of an output connector 171 of the D-A converter 170. The D-A converter 170 is of a known type. More specifically, if the counter 160 is a decimal counter, the D-A converter 170 is of "Kelvin-Varley circuit" type as described in page 51 of "Designing with Linear Integrated Circuits" by J. Eimbinder, Mactier Publishing Corp., New York, 1969, and in page 262 of "Electronic Testing" by L. L. Farkus, McGraw-Hill Book Co., New York, 1966.

The clearing signal generator 135 is also connected to counter 160. The counter 160 clears the recorded number therein, when the signal $S_2$ is fed thereto. Consequently, $E_{xn}$ becomes zero, when the signal $s_2$ is fed to the counter 160.

The part Y is next described below.

Figure 2E:
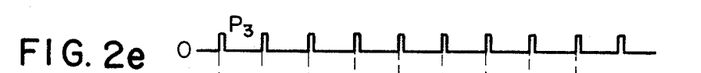
Figure 2F:
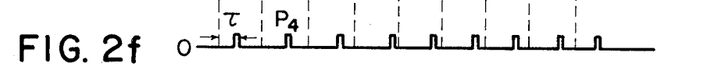

The receiving antenna 211 is connected to a signal receiver 212. When the antenna 211 catches the signal $S_1$ and supplies the signal $S_1$ to the signal receiver 212, the signal receiver 212 produces an electric pulse $P_3$ as shown in FIG. 2e. The signal receiver 212 is connected to an input connector 221 of a flip-flop circuit 220. The laser beam detector 213 is connected to a signal generator 214. The signal generator 214 produces an electric pulse $P_4$ as shown in FIG. 2f, when the laser beam 24 hits the laser beam detector 213. The aforementioned time $\tau$ is shown in FIG. 2f. The laser beam detector 213 comprises a photoelectric cell (not shown in the drawing), and the signal generator 214 comprises a pulse amplifier and a saturation amplifier (both are not shown in the drawing). The signal generator 214 is connected to a second input connector 222 of the flip-flop circuit 220. An output connector 223 of the flip-flop circuit 220 is connected to an input connector 241 of an AND gate 240. A second output connector 224 of the flip-flop circuit 220 is connected to an input connector 272 of a shift register 270. The output connector 224 is also connected to an input connector 262 of a counter 260 by way of a delay circuit 250. A clock pulse generator 230 is connected to a second input connector 242 of the AND gate 240. An output connector 243 of the AND gate 240 is connected with a second input connector 261 of the counter 260. An output connector 263 of the counter 260 is connected with a second input connector 271 of the shift register 270. An output connector 274 of the shift register 270 is connected to a digital-analog converter 280 (hereinafter designated as the D-A converter 280). An output connector 281 of the D-A converter 280 is connected to an terminal 282.

Figure 2G:
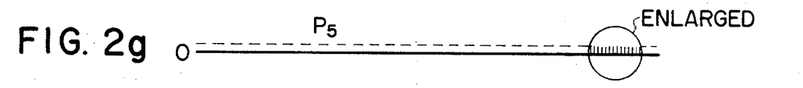
Figure 2H:
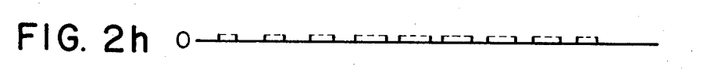
Figure 2I:
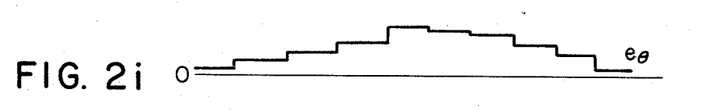
Figure 2J:
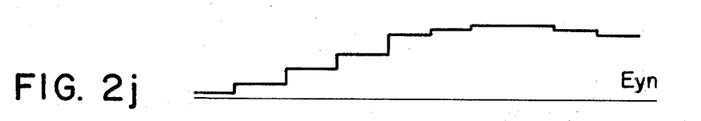

The flip-flop circuit 220 supplies a continuous electric signal $S_5$ to the input connector 241 of the AND gate 240 through the output connector 223 after the circuit 220 receives the pulse $P_3$ through the input connector 221 until the circuit 220 receives the pulse $P_4$ through the input connector 222. During this period no signal appears in the output connector 224. The clock pulse generator 230 produces clock pulses $P_5$ as shown in FIG. 2g, which is supplied to the AND gate 240. The AND gate 240 passes the clock pulses $P_5$ to the counter 260 as long as the signal $S_5$ is supplied to the gate 240. The counter 260 counts the number of the clock pulses $P_5$ and records the number in the form of electric signals until the next one clock pulse $P_5$ comes in. When the pulse $P_4$ is supplied to the flip-flop circuit 220, the flip-flop circuit 220 stops supplying the signal $S_5$ to the AND gate 240 as mentioned before, and at the same time supplies an electric signal $S_4$ to the input connector 272 of the shift register 270 and to the delay circuit 250. When the signal $S_4$ is supplied to the input connector 272, the shift register 270 records the number recorded in the counter 260 through the input connector 271 cancelling simultaneously the number previously recorded in the register 270 itself. The number recorded in the shift register 270 is kept recorded until the next signal $S_4$ is supplied to the register 270. The delay circuit 250 delays the delivery of the signal $S_4$ so that the shift register 270 can finish the recording of the number recorded in the counter 260 before the signal $S_4$ reaches the input connector 262 of the counter 260. When the signal $S_4$ is supplied to the input connector 262, the counter 260 clears the number recorded therein so that the counter 260 can start counting the number of the clock pulse $P_5$ from zero when the pulse $P_3$ is supplied to the flip-flop circuit 220. The number recorded in the shift register 270 is proportional to the time $\tau$. Groups of the clock pulses $P_5$ passed by the AND gate 240 to the counter 260 according to the time $\tau$ are shown in FIG. 2h. The D-A converter 280 produces a voltage $E_\theta$ proportional to the number recorded in the shift register 270. As the number recorded in the shift register 270 is proportional to the time $\tau$, and as the time $\tau$ is proportional to the angle $\theta$, therefore, the voltage $E_\theta$ is proportional to the angle $\theta$. $E_\theta$ is shown in FIG. 2i, and is supplied to the terminal 282 by way of the output connector 281. The clearing signal generator 135 is also connected to a third input connector 273 of the shift register 270. When the signal $S_2$ is supplied to the input connector 273, the shift register 270 clears the number recorded therein. Consequently, at this time E becomes zero. The D-A converter 280 is of the same type as the D-A converter 170, and the counter 260 is also of the same type as the counter 160.

There are several ways of disposing the laser beam rotation center 23 and the laser beam detector 31 with respect to the track measurement starting plane and the test course as shown in FIG. 7a through 7e. Referring to FIG. 7a through 7e, the distance from the laser beam rotation center 23, which is also designated as O in FIG. 7a through 7e, to the track measurement starting plane, which is defined by the points T and S, is designated as $X_o$. The distance from the vehicle represented by the position P of the receiving antenna 110 and the laser beam detector 213 to the track measurement starting plane is designated as $X_n$. The distance measured along the lateral axis of the course from the point P representing the vehicle to the reference vertical plane defined by the point O and the laser beam detector 31 is designated as $Y_n$. Mathematically, if the distance $X_n$ and the angle $\theta$ are given, the point P representing the vehicle is completely determined. Since voltages $E_{xn}$ and $E_\theta$ are proportional to $X_n$ and $\theta$ respectively, $E_{xn}$ and $E_\theta$ can be used for the real-time drawing of the vehicular track on a paper, or for such further processing as computation, or for recording of the voltages themselves.

From practical viewpoint, a voltage proportional to $Y_n$ is useful for the real-time recording of the track. Because the voltage proportional to $Y_n$ makes the use of the X-Y plotter possible for drawing of the track on a paper.

Figure 7A:
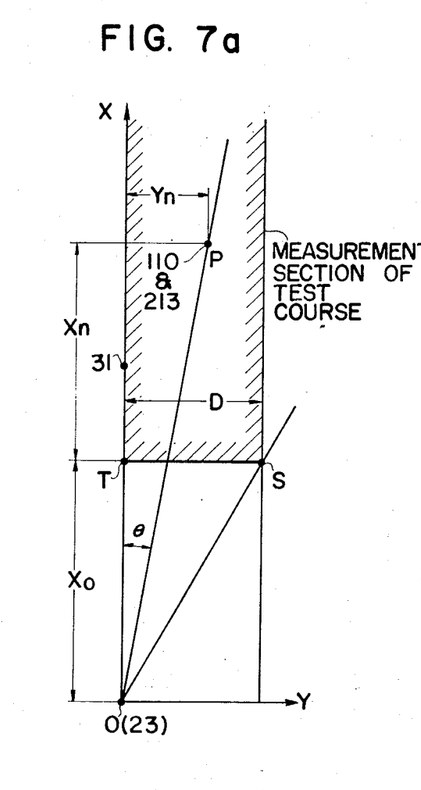
FIG. 7a through 7e are plan views showing dispositions of the laser beam scanner and a laser beam detector, which are shown in FIG. 1, with respect to a track measuring section of the test course.

In FIG. 7a, OX and OY show X and Y axes. The distance $Y_n$ is given by $$Y_n = (X_o = X_n)\tan\theta$$

If $X_o$ is big enough to make $\theta$ sufficiently small so that $\tan\theta$ can be replaced by $\theta$ (radian), $Y_n$ is given by $$Y_n = (X_o = X_n)\theta \quad (1)$$

The maximum error $\delta_m$ (%) of the substitution of $\theta$ for $\tan\theta$ is given by $$\delta_m = \frac{\frac{D}{X_o} - \arctan\frac{D}{X_o}}{\frac{D}{X_o}} \quad (2)$$

where $D$ = width of the test course.

Usually the maximum allowable error $\delta(\%)$ of the substitution of $\theta$ for $\tan\theta$ is given, and $X_o$ is chosen so that $\delta_m \leq \delta$.

Figure 7B:
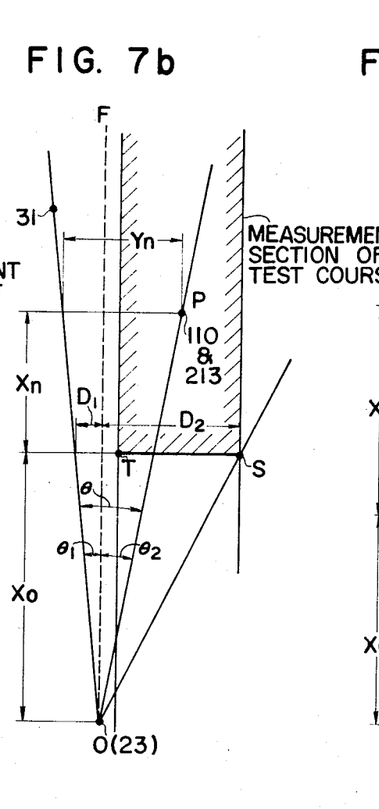
Figure 7C:
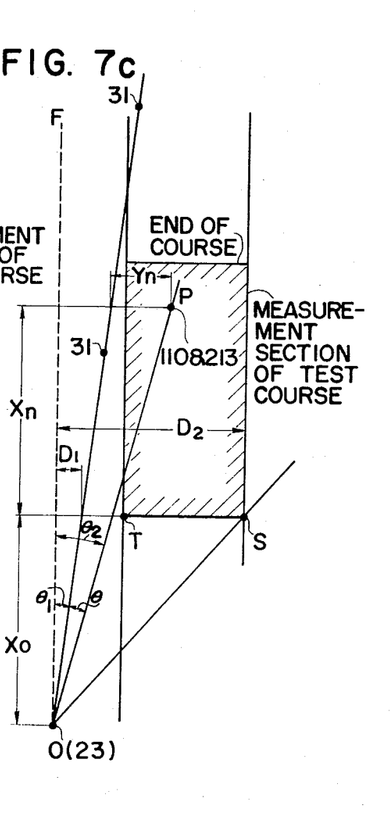
Figure 7D:
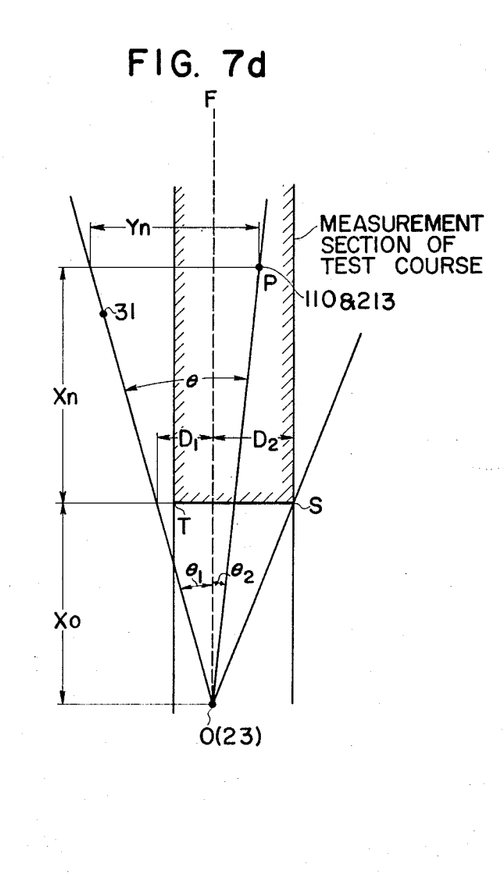

In FIG. 7b and 7d, $Y_n$ is given by $$Y_n = (X_o + X_n)\tan\theta_1 + (X_o + X_n)\tan\theta_2$$

where $\theta_1$ = angle contained by a reference vertical plane and a vertical plane OF with respect to the course parallel to the longitudinal axis of the course and containing the point 0; $\theta_2$ = angle contained by the vertical plane OF and a vertical plane OP with respect to the course containing the point O and the antenna 110 and the detector 213 represented by the point P. Since $\theta = \theta_1 + \theta_2$, if $\theta_1$ and $\theta_2$ are small, $Y_n$ is given by $$Y_n = (X_o + X_n)(\theta_1 + \theta_2)$$
$$= (X_o + X_n)\theta$$

The error $\delta_m$ is given by the formula (2) wherein D is replaced by whichever is bigger between $D_1$ and $D_2$; where $D_1$ = distance from a line of intersection of the reference vertical plane and the extension of the track measurement starting plane to the vertical plane OF; and $D_2$ = distance from the point S to the vertical plane OF.

In FIG. 7c, $Y_n$ is given by $$Y_n = (X_o + X_n)\tan\theta_2 - (X_o + X_n)\tan\theta_1$$

Since $\theta = \theta_2 - \theta_1$, is $X_o$ is big enough, $Y_n$ is given by $$Y_n = (X_o + X_n)(\theta_2 - \theta_1)$$
$$= (X_o + X_n)\theta$$

$\delta_m$ is given by the formula (2) wherein $D$ is replaced by $D_2$. In FIG. 7c two examples of the position of the laser beam detector 31 are shown.

Figure 7E:
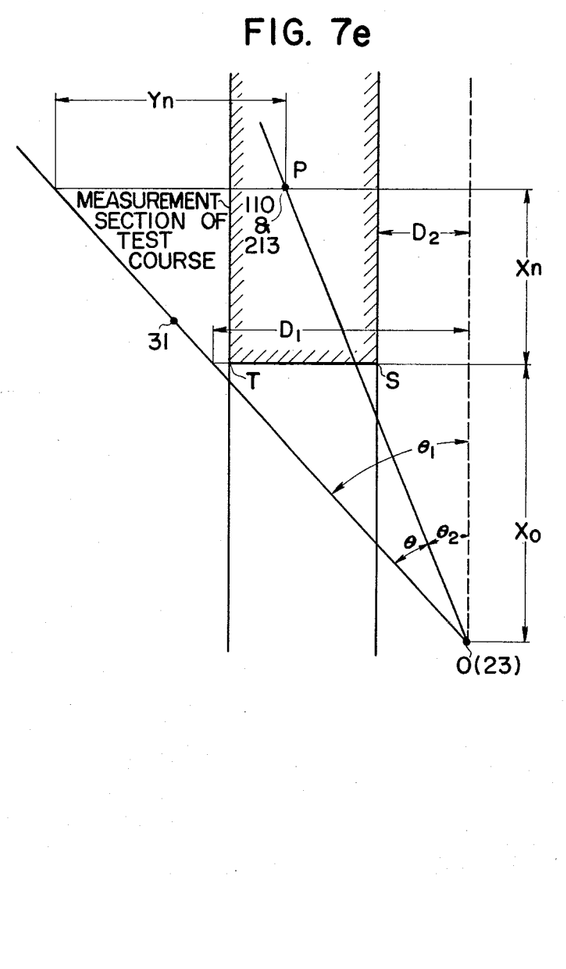

In FIG. 7e, if $X_o$ is sufficiently big, $Y_n$ is given by the formula (1) and $\delta_m$ is given by the formula (2) wherein D is replaced by $D_1$.

In any way, when $\delta$ is given, and if $X_o$ is chosen so that $\delta_m \leq \delta$, then $Y_n$ is given by the formula (1) with an error not more than $\delta$. Consequently, an voltage $E_{Yn}$ proportional to $Y_n$ is produced by multiplying the sum of the voltage $E_{Xn}$ and a voltage $E_{Xo}$ proportional to $X_o$ by the voltage $E_\theta$ with an error not more than $\delta$. In other words, $E_{Yn}$ is given by $$E_{Yn} = (E_{Xo} + E_{Xn})E_\theta$$

In one embodiment for the slalom test of the vehicle adopting the disposition shown in FIG. 7d, the track measurement section of the test course is 15 meters wide and 300 meters long, and $X_o$ is 300 meters so that the angle < TOS is 2°52'.

Referring to FIG. 5, the voltage $E_{Xo}$ is produced by a potentiometer 310. An input connector 321 of an analog adding circuit 320 is connected to the potentiometer 310 and a second input connector 322 of the circuit 320 is connected to the output connector 171 of the D-A converter 170. An output connector 323 of the circuit 320 is connected to an input connector 331 of an analog multiplier 330. A second input connector 332 of the multiplier 330 is connected to the output connector 281 of the D-A converter 280. An output connector 333 of the multiplier 330 is connected to a terminal 334.

The analog adding circuit 320 adds $E_{Xo}$ to $E_{Xn}$. The multiplier 330 multiplies $(I_{Xo} + E_{Xn})$ by $E_\theta$ to produce the voltage $E_{Yn}$. $E_{Yn}$ is supplied by the multiplier 330 to the terminal 334 by way of the output connector 333.

The multiplier 330 is of a known type, and more specifically of "quarter-square multiplier" type as described in page 266 of "Electron-Tube Circuit" by S. Seely, McGraw-Hill Book Co., New York, 1959, and in page 280 of "Electronic Analog Computers" by G. A. Korn et al., McGraw-Hill Book Co., New York, 1956.

The voltages $E_{Xn}$ and $E_{Yn}$ are supplied from the terminals 172 and 334, respectively, to the drawing device such as a X-Y plotter for the real-time drawing of the vehicular track on a paper, or to the recorder such as a magnetic recorder for recording the voltages themselves, or to the computer for further computation. (All these recording devices or computers are not shown in the drawing.)

When the reference vertical plane is not parallel to the longitudinal axis of the course, that is, $\theta_1$ is not zero as shown in FIG. 7b through 7e, the direct feeding of the voltages $E_{Xn}$ and $E_{Yn}$ to the X-Y plotter causes the deviation of the recorded vehicular track from the actual track. Because the X-Y plotter plots the point P on a paper in such a way as if the reference vertical plane is parallel to the longitudinal axis of the course. Therefore, if the reference vertical plane is not parallel to the longitudinal axis of the course, $E_{Yn}$ must be compensated to yield a voltage proportional to a distance from the point P to a vertical plane with respect to the course parallel to the longitudinal axis of the course such as the vertical plane OF before $E_{Xn}$ and $E_{Yn}$ are fed to the X-Y plotter. If the $\theta_1$ is small enough to make it possible to neglect the deviation of the recorded vehicular track from the actual vehicular track, the compensation of $E_{Yn}$ is not necessary and such small deviation is included in the measurement error.

It is claimed:

1. Apparatus for measuring a track of a vehicle running on a test course, comprising: means for generating above said course standing radio waves whose direction of wave propagation is parallel to the longitudinal axis of said course; first generating means having a first receiving antenna and mounted on said vehicle for generating a first voltage proportional to a distance from said first receiving antenna to a track measurement starting plane established on said course so as to be perpendicular to the longitudinal axis of said course, said first generating means including means for counting the number of half-waves of said standing radio waves crossed by said vehicle after said vehicle crosses said track measurement starting plane and means for converting the count of said number of half-waves into a first analog signal; means for scanning said course with a laser beam, said scanning means including means for moving said scanning laser beam at an angular velocity measured in a horizontal plane with respect to said course; means mounted beside said course including a first laser beam detector for generating and transmitting a signal to said vehicle when said scanning laser beam hits said first laser beam detector; second generating means mounted on said vehicle and including signal receiver means and a second laser beam detector for generating a second voltage proportional to an angle contained by a first vertical plane with respect to said course containing a center of rotation of the horizontal component of said scanning laser beam movement and said first laser beam detector and a second vertical plane with respect to said course containing said rotation center and said second laser beam detector, said second generating means including means for counting the time elapsed after said signal receiver means receives said signal until said scanning laser beam hits said second laser beam detector and means for converting the count of said elapsed time into a second analog signal.

2. Apparatus as recited in claim 1, wherein said first voltage generating means comprises, in combination: means including said first receiving antenna for generating a first electric pulse for every cyclic change of the absolute value of the electric field intensity of said standing radio waves as said vehicle moves; gate means connected to said first electric pulse generating means for passing said first electric pulse after said vehicle crosses said track measurement starting plane; means connected to said gate means for counting and recording the number of said first electric pulse; and first digital-analog converter means connected to said first electric pulse counting means for producing said first voltage which is a voltage proportional to the counting result of said first electric pulse counting means.

3. Apparatus as recited in claim 2, wherein said wave generating means comprises, in combination: a high-frequency oscillator; and a pair of transmitting antennas connected to said high-frequency oscillator and disposed substantially above the longitudinal center line of said course at both ends of said course facing each other.

4. Apparatus as recited in claim 2, further comprising: a first laser beam oscillator for directing a further laser beam within said track measurement starting plane; and wherein said gate means comprises, in combination: means including a third laser beam detector for generating a second electric pulse when said further laser beam hits said third laser beam detector; a first flip-flop circuit connected to said second electric pulse generating means and having an output connector, said first flip-flop circuit supplying a continuous output to said first flip-flop circuit output connector after said first flip-flop circuit receives said second electric pulse from said second electric pulse generating means; and a first AND gate having (1) one input connector connected to said first electric pulse generating means to receive said first electric pulse therefrom, (2) a second input connector connected with said first flip-flop circuit output connector to receive said first flip-flop circuit output therefrom, and (3) an output connector connected to said first electric pulse counting means, whereby said first AND gate passes said first electric pulse to said first electric pulse counting means as long as said first AND gate receives said first flip-flop circuit output.

5. Apparatus as recited in claim 4, wherein said wave generating means comprises, in combination: a high-frequency oscillator; and a pair of transmitting antennas connected to said high-frequency oscillator and disposed substantially above the longitudinal center line of said course at both ends of said course facing each other.

6. Apparatus as recited in claim 1, wherein said second voltage generating means comprises, in combination: means for generating clock pulses; means including said signal receiver means and said second laser beam detector and having an input connector connected with said clock pulse generating means and a first and a second output connectors for passing said clock pulses continuously after said signal receiver means receives said signal until said scanning laser beam hits said second laser beam detector and generating a first electric signal after said scanning laser beam hits said second laser beam detector, said clock pulses being passed through said passing means first output connector, said first electric signal being supplied to said passing means second output connector; means having an input connector connected with said passing means first output connector for counting and recording the number of said clock pulses; shift register means having a first input connector connected with an output connector of said clock pulse counting means and a second input connector connected with said passing means second output connector for recording the number recorded in said clock pulse counting means when said first electric signal is supplied to said shift register means second input connector, said shift register means cancelling the number previously recorded therein when said shift register means records a new number; delay circuit means connected with said passing second output connector and with a further input connector of said clock pulse counting means for delaying the delivery of said first electric signal so that said first electric signal reaches said clock pulse counting means after said recording by said shift register means finishes, said clock pulse counting means cancelling the number recorded therein when said first electric signal is supplied to said clock pulse counting means further input connector; said second digital-analog converter means connected to an output connector of said shift register means for producing said second voltage which is a voltage proportional to the number recorded in said shift register means.

7. Apparatus as recited in claim 6, wherein said passing means comprises, in combination: said signal receiver means for generating a third electric pulse when said signal receiver means receives said signal; means including said second laser beam detector for generating a fourth electric pulse when said scanning laser beam hits said second laser beam detector; a second flip-flop circuit having (1) a first input connector connected to said signal receiver means to receive said third electric pulse therefrom, (2) a second input connector connected to said fourth electric pulse generating means to receive said fourth electric pulse therefrom, and (3) a first and a second output connectors, said second flip-flop circuit supplying a continuous second electric signal to said second flip-flop circuit first output connector after said second flip-flop circuit receives said third electric pulse until said second flip-flop circuit receives said fourth electric pulse, said second flip-flop circuit supplying said first electric signal to said second flip-flop circuit second output connector when said second flip-flop circuit receives said fourth electric pulse, said passing means second output connector comprising said second flip-flop circuit second output connector, thereby said first electric signal being supplied from said second flip-flop circuit to said shift register means and said delay circuit means; and a second AND gate having a first and a second input connectors and an output connector, said second AND gate first input connector being connected with said second flip-flop circuit first output connector to receive said second electric signal therefrom, said passing means input connector comprising said second AND gate second input connector to supply said clock pulses to said second AND gate, said passing means first output connector comprising said second AND gate output connector to supply said clock pulses from said second AND gate to said clock pulse counting means.

8. Apparatus as recited in claim 6, wherein said first voltage generating means comprises, in combination: means including said first receiving antenna for generating a first electric pulse for every cyclic change of the absolute value of the electric field intensity of said standing radio waves as said vehicle moves; gate means connected to said first electric pulse generating means for passing said first electric pulse after said vehicle crosses said track measurement starting plane; means connected to said gate means for counting and recording the number of said first electric pulse; and first digital-analog converter means connected to said first electric pulse counting means for producing said first voltage which is a voltage proportional to the counting result of said first electric pulse counting means; and said wave generating means comprises, in combination: a high-frequency oscillator; and a pair of transmitting antennas connected to said high-frequency oscillator and disposed substantially above the longitudinal center line of said course at both ends of said course facing each other.

9. Apparatus as recited in claim 7, wherein said first voltage generating means comprises, in combination: means including said first receiving antenna for generating a first electric pulse for every cyclic change of the absolute value of the electric field intensity of said standing radio waves as said vehicle moves; gate means connected to said first electric pulse generating means for passing said first electric pulse after said vehicle crosses said track measurement starting plane; means connected to said gate means for counting and recording the number of said first electric pulse; and first digital-analog converter means connected to said first electric pulse counting means for producing said first voltage which is a voltage proportional to the counting result of said first electric pulse counting means; and said wave generating means comprises, in combination: a high-frequency oscillator; and a pair of transmitting antennas connected to said high-frequency oscillator and disposed substantially above the longitudinal center line of said course at both ends of said course facing each other.

10. Apparatus as recited in claim 9, further comprising: a first laser beam oscillator for directing a further laser beam within said track measurement starting plane; and wherein said gate means comprises, in combination: means including a third laser beam detector for generating a second electric pulse when said further laser beam hits said third laser beam detector; a first flip-flop circuit connected to said second electric pulse generating means and having an output connector, said first flip-flop circuit supplying a continuous output to said first flip-flop circuit output connector after said first flip-flop circuit receives said second electric pulse from said second electric pulse generating means; and a first AND gate having (1) one input connector connected to said first electric pulse generating means to receive said first electric pulse therefrom, (2) a second input connector connected with said first flip-flop circuit output connector to receive said first flip-flop circuit output therefrom, and (3) an output connector connected to said first electric pulse counting means, whereby said first AND gate passes said first electric pulse to said first electric pulse counting means as long as said first AND gate receives said first flip-flop circuit output.

11. Apparatus as recited in claim 10, wherein said scanning means comprises, in combination: a frame; a second laser beam oscillator mounted on said frame; a motor mounted on said frame; and a disc (1) rotatively mounted on said frame, (2) driven by said motor, and (3) having a plurality of plane mirrors; each of said mirrors being disposed on said disc at regular intervals with the reflective surface thereof being parallel to an axis of rotation of said disc and contacting an inscribed circle concentric with said disc rotation axis; said disc rotation axis being vertical with respect to said course; said second laser beam oscillator being so disposed that a center line of a still further laser beam generated by said second laser beam oscillator is perpendicular to said disc rotation axis and is at a distance from said disc rotation axis; said still further laser beam being reflected by one of said mirrors at a time to become said scanning laser beam.

12. Apparatus as recited in claim 11, wherein (1) said signal comprises a third electric signal; and (2) said generating and transmitting means comprises, in combination: means including said first laser beam detector for generating said third electric signal when said scanning laser beam hits said first laser beam detector; and radio transmitter means including a further transmitting antenna and connected to said third electric signal generating means for transmitting said third electric signal; and further (3) said signal receiver means includes a second receiving antenna to receive said third electric signal.

13. Apparatus as recited in claim 1, further comprising: means for generating a third voltage which is proportional to a distance from said rotation center to said track measurement starting plane; means connected to said first voltage generating means and to said third voltage generating means for adding said first voltage to said third voltage to produce a fourth voltage which is proportional to a distance from said rotation center to a third vertical plane perpendicular to the longitudinal axis of said course and containing said first receiving antenna; means connected to said adding means and to said second voltage generating means for multiplying said second voltage by said fourth voltage to produce a fifth voltage which is proportional to a distance from said first receiving antenna to a line of intersection of said first vertical plane and said third vertical plane.

14. Apparatus as recited in claim 13, wherein the distance $X_o$ from said rotation center to said track measurement starting plane is determined so as to satisfy the following formula in order to make an error caused by the substitution of an angle for the tangent of the same angle smaller than a given allowable limit of error $\delta$ (%):

$$\frac{\frac{D}{X_o} - \arctan \frac{D}{X_o}}{\frac{D}{X_o}} \times 100 < \delta$$

where $D =$ (1) a distance which is longer between the following two distances: one is a distance from a line of intersection of said track measurement starting plane or an extension thereof and said first vertical plane to a fourth vertical plane with respect to said course parallel to the longitudinal axis of said course and containing said rotation center; and the other is a distance from a point of intersection of said track measurement starting plane and a farther distant boundary side line of said course parallel to the longitudinal axis of said course from said laser beam detector than the other boundary side line parallel to the longitudinal axis of said course to said fourth vertical plane, if said fourth vertical plane is outside the area defined by and between said farther distant boundary side line and said other boundary side line or extensions thereof and either on a side where said first laser beam detector is located or on a side which is nearer to said first laser beam detector than the other side, or if said fourth vertical plane is in said defined area; or (2) a distance from a line of intersection of said track measurement starting plane and said first vertical plane to said fourth vertical plane, if said fourth vertical plane is outside said defined area and either on an opposite side to the side where said first laser beam detector is located or on a further distant side from said first laser beam detector than the other side.

15. Apparatus as recited in claim 10, further comprising: means for generating a third voltage which is proportional to a distance from said rotation center to said track measurement starting plane; means connected to said first voltage generating means and to said third voltage generating means for adding said first voltage to said third voltage to produce a fourth voltage which is proportional to a distance from said rotation center to a third vertical plane perpendicular to the longitudinal axis of said course and containing said first receiving antenna; means connected to said adding means and to said second voltage generating means for multiplying said second voltage by said fourth voltage to produce a fifth voltage which is proportional to a distance from said first receiving antenna to a line of intersection of said first vertical plane and said third vertical plane; and wherein the distance $X_o$ from said rotation center to said track measurement starting plane is determined so as to satisfy the following formula in order to make an error caused by the substitution of an angle for the tangent of the same angle smaller than a given allowable limit of error $\delta$ (%):

$$\frac{\frac{D}{X_o} - \arctan \frac{D}{X_o}}{\frac{D}{X_o}} \times 100 < \delta$$

where $D =$ (1) a distance which is longer between the following two distances: one is a distance from a line of intersection of said track measurement starting plane or an extension thereof and said first vertical plane to a fourth vertical plane with respect to said course parallel to the longitudinal axis of said course and containing said rotation center; and the other is a distance from a point of intersection of said track measurement starting plane and a farther distant boundary side line of said course parallel to the longitudinal axis of said course from said first laser beam detector than the other boundary side line parallel to the longitudinal axis of said course to said fourth vertical plane, if said fourth vertical plane is outside the area defined by and between said farther distant boundary side line and said other boundary side line or extensions thereof and either on a side where said first laser beam detector is located or on a side which is nearer to said first laser beam detector than the other side, or if said fourth vertical plane is in said defined area; or (2) a distance from a line of intersection of said track measurement starting plane and said first vertical plane to said fourth vertical plane, if said fourth vertical plane is outside said defined area and either on an opposite side to the side where said first laser beam detector is located or on a farther distant side from said first laser beam detector than the other side.

16. Apparatus as recited in claim 15, wherein said scanning means comprises, in combination: a frame; a second laser beam oscillator mounted on said frame; a motor mounted on said frame; and a disc (1) rotatively mounted on said frame, (2) driven by said motor, and (3) having a plurality of plane mirrors; each of said mirrors being disposed on said disc at regular intervals with the reflective surface thereof being parallel to an axis of rotation of said disc and containing an inscribed circle concentric with said disc rotation axis; said disc rotation axis being vertical with respect to said course; said second laser beam oscillator being so disposed that a center line of a still further laser beam generated by said second laser beam oscillator is perpendicular to said disc rotation axis and is at a distance from said disc rotation axis; said still further laser beam being reflected by one of said mirrors at a time to become said scanning laser beam.

17. Apparatus as recited in claim 16, wherein (1) said signal comprises a third electric signal; and (2) said generating and transmitting means comprises, in combination: means including said first laser beam detector for generating said third electric signal when said scanning laser beam hits said first laser beam detector; and radio transmitter means including a further transmitting antenna and connected to said third electric signal generating means for transmitting said third electric signal; and further (3) said signal receiver means includes a second receiving antenna to receive said third electric signal.

* * * * *